United States Patent [19]
Takada et al.

[11] Patent Number: 5,398,101
[45] Date of Patent: Mar. 14, 1995

[54] IMAGE FORMING APPARATUS CAPABLE OF COPYING IMAGES ON VARIOUS COPY ITEMS

[75] Inventors: Akihiro Takada; Masahiko Fukano; Tetsuya Kagawa; Koji Izumi; Hiroshi Kageyama, all of Osaka, Japan

[73] Assignee: Mita Industrial Co., Ltd., Osaka, Japan

[21] Appl. No.: 243,347

[22] Filed: May 16, 1994

[30] Foreign Application Priority Data

May 21, 1993 [JP] Japan .................................. 5-120081

[51] Int. Cl.6 ...................... G03G 21/00; G03G 15/04; G03G 15/20
[52] U.S. Cl. .................... 355/208; 355/243; 355/282; 355/311
[58] Field of Search .................. 355/55, 56, 208, 243, 355/244, 282, 311, 317

[56] References Cited
U.S. PATENT DOCUMENTS

4,782,371 11/1988 Yokota ............................ 355/244 X
4,789,879 12/1988 Murakami ........................... 355/244
4,792,828 12/1988 Ozawa et al. ....................... 355/317
5,282,001 1/1994 Watson .............................. 355/208
5,285,247 2/1994 Itoh ................................... 355/282

Primary Examiner—William J. Royer
Attorney, Agent, or Firm—Jordan and Hamburg

[57] ABSTRACT

An image forming apparatus includes a toner image forming device for forming a toner image corresponding to an image of an original document at a set operative copying magnification, a transfer device for transferring the toner image onto a copy item, a fixing device for fixing the toner image on the copy item under heat, a memory for storing correction values for a plurality of types of copy item usable in the image forming apparatus respectively, the correction value being adapted for correcting a change in length of a copy item due to the heat of the fixing device, a judge device for judging what type the present copy item is of, and a magnification setting device for setting an operative copying magnification to correct a shrink of the present copy item due to the fixing heat.

9 Claims, 6 Drawing Sheets

IMAGE FORMING APPARATUS CAPABLE OF COPYING IMAGES ON VARIOUS COPY ITEMS

BACKGROUND OF THE INVENTION

This invention relates to an image forming apparatus capable of selectively copying an image of a document (document image) on a plurality of types of copy items such as normal paper sheets, tracing paper, film sheets, and the like.

Image forming apparatuses such as copying machines have been conventionally such that a document image is copied on a copy sheet at a copying magnification set by operating an operating unit.

These apparatuses normally operate as follows. The document image is read optically by an optical assembly including an optical system to form an electrostatic latent image on the circumferential surface of a photosensitive drum. Charged toner is supplied to the latent image, thereby developing the latent image into a toner image. This toner image is transferred to a copy sheet, which is heated while being pressed against the copy sheet in a fixing device so that the toner image is fixed thereon.

Having the property of shrinking upon being subjected to the heat, the copy sheet is subject to the thermal shrinkage when passing through the fixing device, which results in a change in the size of the copy sheets. Since the document image formed on the copy sheet shrinks as the copy sheet shrinks, there is a discrepancy between the set nominal copying magnification and an actual magnification of the document image formed on the copy sheet. Particularly in the copying operation where the magnification is life-size or 1, it can be seen easily that the size of the image on the document and that on the copy differ, resulting in the reduced reliability.

Thus, in the conventional image forming apparatuses, the optical system is adjusted so that the magnification of the document image fixed to a normal paper sheet which is frequently used as a copy sheet corresponds with the set nominal copying magnification.

However, instead of normal paper sheets, tracing paper and film sheets are sometimes used for the copying operation and the degree of thermal shrinkage differs depending upon the type of copy sheet. For example, upon being subjected to the heat, a 2000 mm long normal paper sheet shrinks 2 mm and a 2000 mm long film sheet shrinks as much as 10 mm as shown in TABLE-1 to be described later. Thus, with the image forming apparatus wherein the optical assembly is adjusted based on the normal paper sheet, there is a large discrepancy between the magnification of the document image on the film sheet and the set nominal copying magnification.

In order to avoid this problem, an operator has been forced to adjust the optical system through trial and error when a document image is copied on a film sheet. This is disadvantageous because a cumbersome adjustment is necessary each time the film sheet is used and the copy sheet is wasted upon the improper adjustment.

SUMMARY OF THE INVENTION

It is an object of the invention to provide an image forming apparatus which has overcome the above-mentioned problems residing in the prior art.

It is another object of the invention to provide an image forming apparatus which enables a magnification of a document image on a copy item to coincide with a set nominal magnification accurately and automatically irrespective of the type of copy item.

Accordingly, the invention is directed to an image forming apparatus comprising: toner image forming means for forming a toner image corresponding to an image of an original document at a set operative copying magnification; transfer means for transferring the toner image onto a copy item; fixing means for fixing the toner image on the copy item under heat; storage means for storing correction values for a plurality of types of copy item usable in the image forming apparatus respectively, the correction value being adapted for correcting a change in length of a copy item due to the heat of the fixing means; judge means for judging what type the present copy item is of; and magnification setting means for setting an operative copying magnification for the toner image forming means, the magnification setting means including: nominal copying magnification setting means for setting a nominal copying magnification; correcting means for reading a correction value corresponding to the judged copy item type from the storage means and correcting the set nominal copying magnification into the operative copying magnification.

In thus constructed image forming apparatus, the correction value corresponding to the change in the longitudinal and lateral dimensions of the copy item due to the heat during the fixing operation is stored in the storage means in correspondence with the type of copy item. The type of copy item is judged, the correction value corresponding to the judged type of copy item is read from the storage means, and the set nominal magnification is corrected based on this correction value by as much as the change in the size of the copy item. Thus, the magnification of the document image on the copy item coincides with the nominal magnification.

The judge means may judge the type of copy item selected manually. With this arrangement, when the type of copy item is selected manually, the selected type of copy item is judged; the correction value corresponding to the judged type of copy item is read from the storage means; and the set nominal magnification is corrected according to the correction value.

The judge means may include detection means provided on the copy item holder for detecting the type of copy item placed in the copy item holder. The detection means may be provided with a detector for detecting the material of copy item to judge the type of copy item. Alternatively, it may be appreciated that the copy item holder is further provided with an identification member for identifying the type of copy item placed in the copy item holder; and the detection means includes a detector for detecting the identification member to judge the type of copy item.

With this arrangement, the type of copy item is detected automatically; the detected type of copy item is judged; the correction value corresponding to the judged type of copy item is read from the storage means; and the set nominal magnification is corrected according to the correction value.

The toner image forming means may be constructed by optical image reading means for reading an optical image from the document in a main scanning direction while rendering a relative movement in a sub-scanning direction with respect to the document, and an optical system having a variable magnification for introducing the optical image to the optical image reading means. The correcting means may be constructed by operable means for changing the magnification of the optical system and the relative movement speed in the sub-scanning direction of the optical image reading means to attain the operative copying magnification.

Also, the toner image forming means may be provided with image processor means for processing an electrical image data, and the correcting means may be constructed by image processor control means for controlling the image processor to correct the electrical image data to attain the operative magnification. Further, the correcting means may be provided with operable means for changing the relative movement speed in the sub-scanning direction of the optical image reading means.

Furthermore, the toner image forming means may be constructed by an optical system having a variable magnification for introducing an optical image from the document to the photosensitive member, and the correcting means may be provided with operable means for changing the magnification of the optical system to attain the operative copying magnification.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
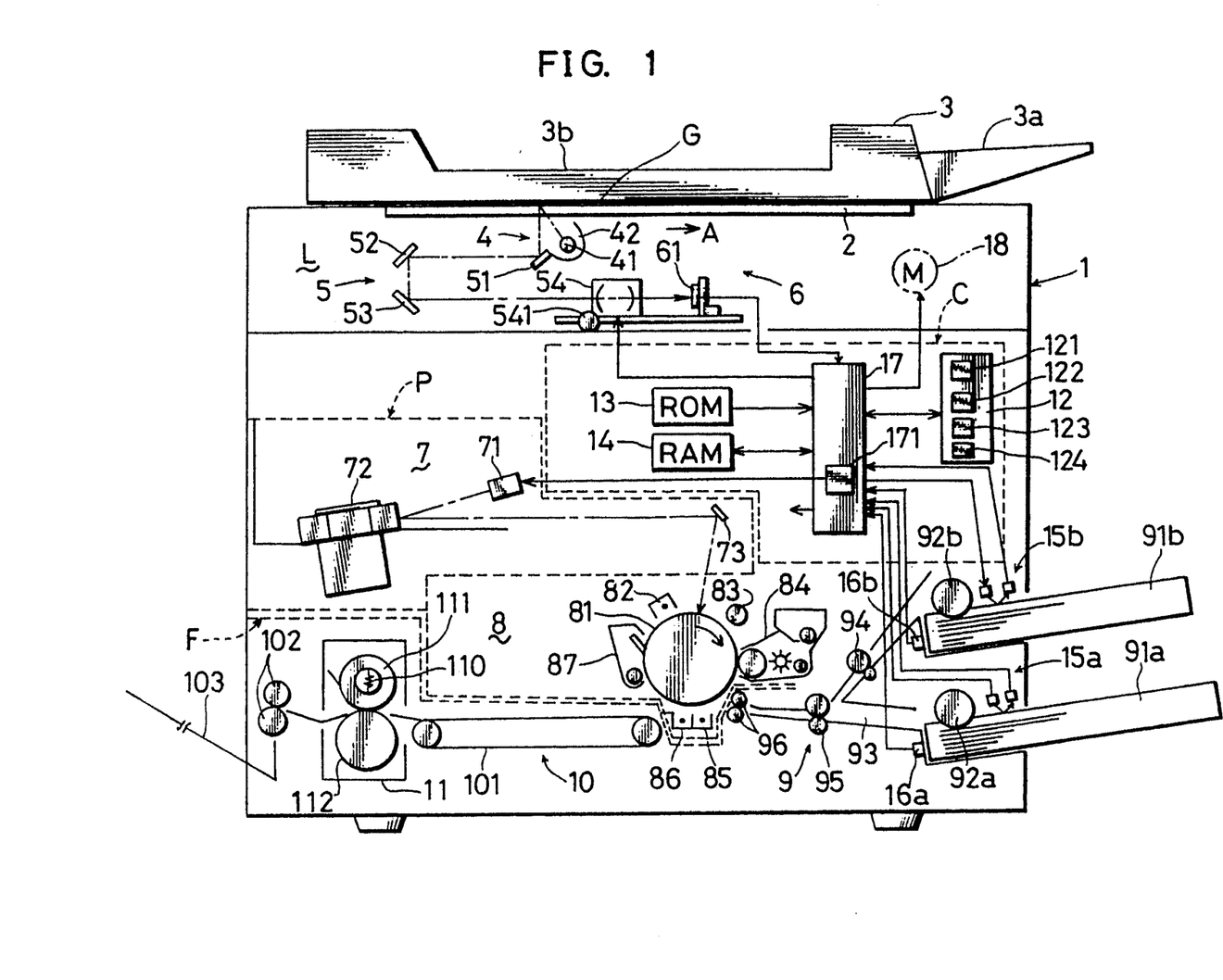
FIG. 1 is a schematic construction diagram showing an exemplary digital copying machine according to the invention.

FIG. 1 is a schematic construction diagram showing an exemplary image forming apparatus (digital copying machine) 1 as an embodiment of the invention. The apparatus 1 is provided with transparent document platen 2 and an automatic document handler 3 at an upper portion, and an optical assembly L, a control system C, an imaging assembly P and copy sheet transport assembly F in the interior.

The document handler 3 transports documents G placed on a document tray 3a one by one to a specified position on the document platen 2 when a copying operation is started, and discharges these documents onto a discharge tray 3b when the reading of image data is completed.

Figure 2:
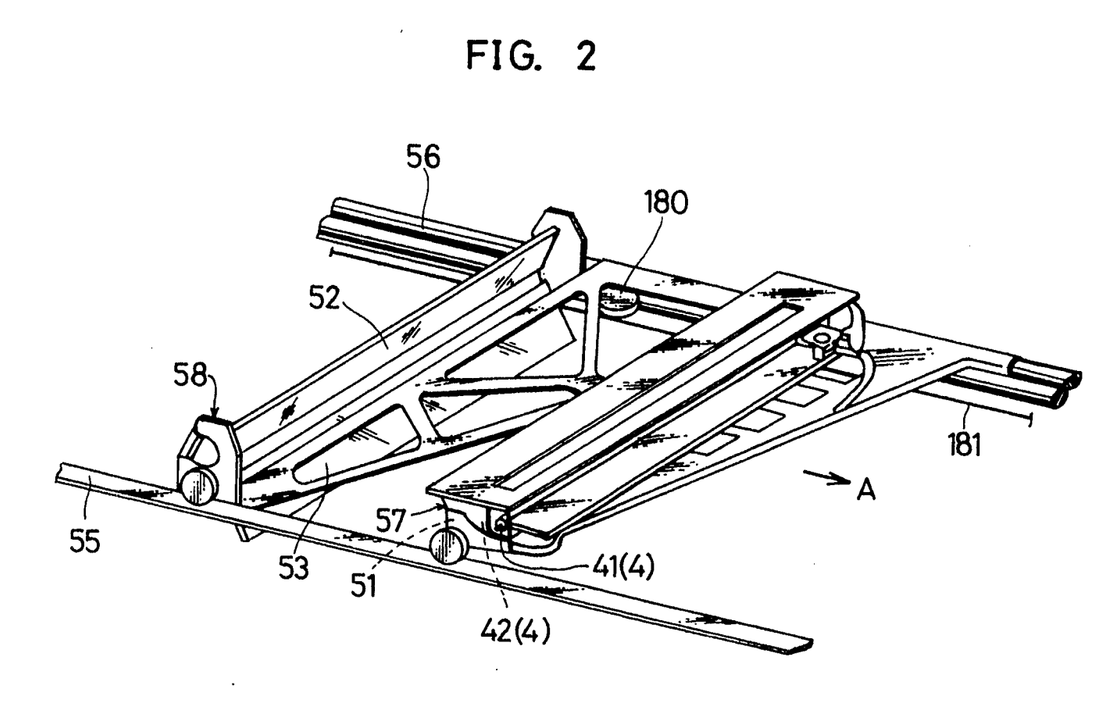
FIG. 2 is a perspective view showing a mechanism for sliding a light source unit and reflection mirrors.

The optical assembly L is provided with a light source unit 4 including a halogen lamp 41 and a reflecting plate 42, a focusing device 5 including reflection mirrors 51, 52, 53 and a lens unit 54 having a magnification varifier 541, and an image pick-up device 6 including a solid state image sensor (hereinafter referred to as a CCD) 61 including sensing elements arranged in a line. The light source unit 4 and the reflection mirror 51 are fixedly mounted on a first movable member 57, and the reflection mirrors 52, 53 are fixedly mounted on a second movable member 58. The movable members 57, 58 are both slidably mounted on a pair of guide rods 55, 56. These movable members 57, 58 are moved reciprocally in a direction of an arrow A in FIG. 1 through a wire 181 wound between shafts of a pulley 180 and a scanner motor 18 arranged at specified positions in the optical assembly L.

The magnification varifier 541 includes a motor, a cam, and the like, and moves a lens in the lens unit 54 to change a magnification of the lens unit 54.

Upon the start of the copying operation, the optical assembly L causes the halogen lamp 41 to emit a light and causes the movable members 57, 58 to move in a sub-scanning direction (direction A in FIG. 1) respectively at specified speeds so as to scan an image on the document G placed on the document platen 2. The light from the halogen lamp 41 is projected onto the document G and reflected thereby. The reflected light is introduced to the CCD 61 through the reflection mirrors 51 to 53 and the lens unit 54. A light image representing the image on the document G is focused on a sensing surface of the CCD 61 after the magnification thereof is adjusted through the lens unit 54. This light image is converted photoelectrically by the CCD 61 for each main scanning line and is read as an electric signal (hereinafter referred to as an image signal). This image signal is stored temporarily in a RAM 14 provided in the control system C after being converted into an image data. The control system C will be described in detail later.

The imaging assembly P is provided with an image data output device 7 for outputting the image data from the control system C as an optically modulated signal, and an imaging unit 8 for forming an image based on the image data. The output device 7 includes a laser emitter 71, a polygonal mirror 72, and a reflection mirror 73. The imaging unit 8 includes a photosensitive drum 81, a charger 82, a blank lamp 83, a developing device 84, a transfer device 85, a separating device 86, and a cleaner 87.

The laser emitter 71 emits a laser beam modulated by the image data serially output from the control system C to the polygonal mirror 72. This laser beam is projected to the drum 81 through the polygonal mirror 72 and the reflection mirror 73. Simultaneously, the reflecting surface of the polygonal mirror 72 is rotated in synchronism with an emitting timing of the laser emitter 71, causing the laser beam projected to the drum 81 to scan in a main scanning direction (a direction parallel to a shaft of the drum 81). According to the rotation of the drum 81, the laser beam relatively raster-scans the circumferential surface of the drum 81, and thereby an electrostatic latent image is formed on this circumferential surface of the drum 81.

The circumferential surface of the drum 81 is charged by the charger 82 to have a specified surface potential. The charges outside an area where the laser beam is projected are removed by the blank lamp 83 based on a copy sheet size data. The surface potential in the laser beam projected area changes due to the projection of the laser beam, thereby an electrostatic latent image of the document G is formed. Charged toner is supplied to this latent image, thereby developing the latent image into a toner image. A copy sheet is fed from a feeding unit 9 in synchronism with the emitting timing of the laser emitter 71. The toner image on the drum 81 is transferred to this copy sheet when the copy sheet passes the position of the transfer device 85.

The transport assembly F, which is arranged below the imaging assembly P, is provided with the feeding unit 9 and a transporting unit 10. The feeding unit 9 includes cassettes 91a, 91b, feed rollers 92a, 92b, a guide member 93, pairs of transport rollers 94, 95, and a pair of registration rollers 96. The transporting unit 10 includes a transport belt 101 and a pair of discharge rollers 102 in this order from an upstream side. At a downstream side of the transporting unit 10, there is provided a discharge tray 103. The cassettes 91a, 91b are attached to a main body of the image forming apparatus 1 with normal paper sheets, semitransparent tracing paper, or transparent film sheets therein.

A fixing device 11 is provided between the transport belt 101 and the discharge roller pair 102. The fixing device 11 includes a heating roller 111 provided internally with a heater 110 and a pressing roller 112 which transports the copy sheet in cooperation with the heating roller 111 while pressing the copy sheet against the heating roller 111. The toner image on the copy sheet is fixed while being heated at a temperature suitable to fuse the toner and being pressed against the copy sheet.

The copy sheet to which the toner image is transferred by the transfer device 85 is separated from the drum 81 by the separating device 86 and then transferred by the transport belt 101 to the fixing device 11 to have the toner image fixed thereto. Thereafter, the copy sheet is discharged onto the discharge tray 103 through the discharge roller pair 102. The toner remaining on the circumferential surface of the drum after the copying operation is removed by the cleaner 87 before the next copying operation.

The control system C is provided at a specified position in the image forming apparatus 1. The control system C has an operation unit 12, a ROM 13 for storing various data including a magnification correction value corresponding to the type of copy sheet and a control program, a RAM 14 for storing image data or the like, and a control unit 17. The operation unit 12 is provided with various switches including a sheet selection switch 121, a magnification switch 122, a start switch 123 and a display panel 124 for displaying an operation content. The switch 121 is operated manually to select the type of copy sheet, i.e., normal paper sheet, tracing paper, or film sheet. The switch 122 is operated to designate a nominal copying magnification at which the document image is desired to be copied on the copy sheet. The switch 123 is operated to designate the start of the copying operation. The control unit 17 includes an image processor 171 and controls centrally elements of the image forming apparatus 1. Sheet sensors 15a, 15b are provided to detect automatically the type of copy sheet contained in the cassettes 91, 91b, respectively.

The sheet sensors 15a, 15b have each a photosensor or like device including light emitting and light receiving elements, and are arranged near and above the uppermost copy sheet in the cassettes 91a, 91b. The light receiving element of each sheet sensor is arranged at such a position or such an angle that it receives only the light which is emitted from the light emitting element and reflected by the surface of the uppermost copy sheet. The sheet sensors 15a, 15b output light reception levels (light reception signals) of the light receiving elements to the control unit 17.

The control unit 17 causes the image processor 171 to convert the image signal generated by the CCD 61 into an image data. The image data is stored temporarily in the RAM 14 and outputted to the image data output device 7.

Further, the control unit 17 sets a moving speed of each of the movable members 57, 58, i.e., a speed at which the document image is scanned in the sub-scanning direction so that the document image is fixed on the copy sheet at a set operative copying magnification, and sets an operative magnification of the lens unit 54.

When the sheet selection switch 121 is operated to select the type of copy sheets containing in the cassettes 91a, 91b and the start switch 123 is operated to start the copying operation, the control unit 17 reads a magnification correction value corresponding to the type of copy sheet (TABLE-1) from the ROM 13 so as to correct the shrinkage of the document image due to the thermal shrinkage of the copy sheet when the toner image is fixed to the copy sheet. The control unit 17 corrects the nominal copying magnification based on the magnification correction value, and makes such a correction that the magnification of the lens unit 54 becomes larger than that for the nominal copying magnification and the moving speeds of the movable members 57, 58 becomes slower than that for the nominal copying magnification, so that the document image is formed on the drum 81 at the corrected copying magnification.

TABLE-1

| TYPE OF COPY SHEET | SHRINKAGE AMOUNT RELATIVE TO THE SIZE OF THE SHEET (mm) | | | MAG. CORRECTION VALUE (%) |
| --- | --- | --- | --- | --- |
| | 420 | 1000 | 2000 | |
| A | −0.5 | −1 | −2 | 0.1 |
| B | −1 | −2 | −5.5 | 2.4 |
| C | −3 | −5.5 | −10 | 5.8 |

A: NORMAL PAPER SHEET,
B: TRACING PAPER,
C: FILM SHEET

Figure 6:
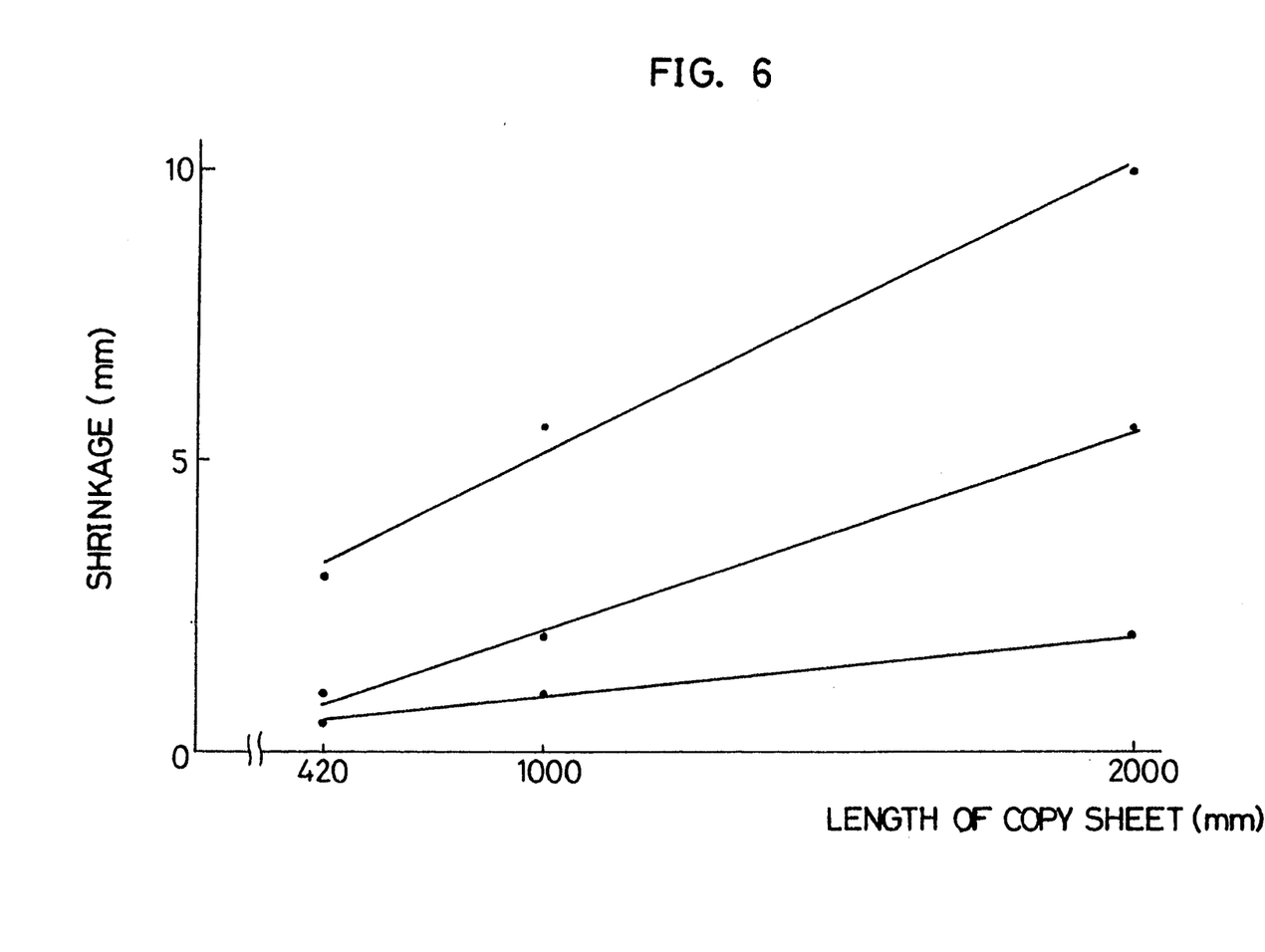
FIG. 6 is a graph showing an amount of shrinkage of three types of copy item.

As shown in FIG. 6, the thermal shrinkage of the normal paper sheet, the tracing paper, and the film sheet is substantially in direct proportion to the size of the respective copy sheets. Accordingly, the magnification correction values of the normal paper sheet, the tracing paper, and the film sheet are fixed values regardless of the longitudinal and lateral dimensions of the copy sheets. For instance, with the normal paper sheet, the copying magnification is corrected to 1.001 when the nominal copying magnification is 1, and corrected to 1.5015 when the nominal copying magnification is 1.5.

The control unit 17 may detect automatically the type of copy sheets contained in the cassettes 91a, 91b in accordance with sensor signals from the sheet sensors 15a, 15b. More specifically, when the copy sheets in the cassettes 91a, 91b are normal paper sheets, the lights from the light emitting elements of the sensors 15a, 15b are reflected almost completely by the surface of the uppermost copy sheets. Thus, the light receiving elements output the light reception signals of high level to the control unit 17. When the copy sheets are tracing paper, the lights from the light emitting elements transmit through the tracing paper only to a certain extent. Thus, the level of the light reception signals outputted from the light receiving elements to the control unit 17 is lower than when the copy sheets are normal paper sheets. When the copy sheets are transparent film sheets, the lights from the light emitting elements mostly transmit the film sheets. Thus, the level of the light reception signals outputted from the light receiving elements to the control unit 17 is even lower than when the copy sheets are tracing paper.

Magnetic sensors 16a, 16b are arranged at positions opposing identification members provided at positions determined according to the type of copy sheets on leading faces of the cassettes 91a, 91b. The identification members may, for example, include a magnet. The type of copy sheets contained in the cassettes 91a, 91b is detected automatically by detecting magnetically the position of the identification members with the use of the magnetic sensors 16a, 16b.

Figure 3:
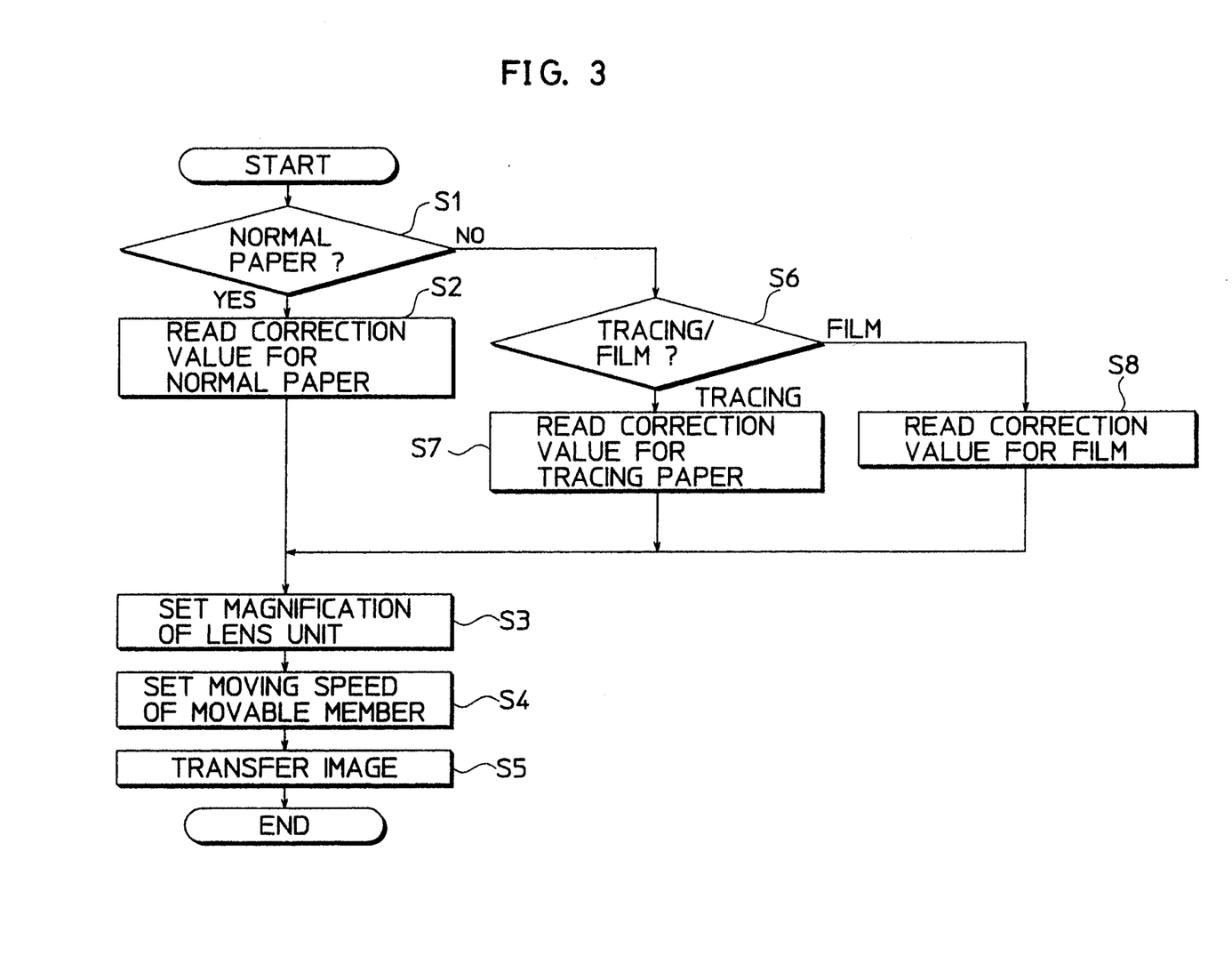
FIG. 3 is a flow chart showing a copying magnification correcting operation in the digital copying machine.

A copying operation in the above constructed image forming apparatus will be described next with reference to a flow chart shown in FIG. 3. In order to avoid the complication, there will be described the copying operation applied to the copy sheets contained in the cassette 91a.

When a nominal copying magnification is set and the start switch 122 is operated, the copying operation of this flow chart starts. When the copy sheets contained in the cassette 91a are normal paper sheets (YES in Step S1), the magnification correction value (0.1%) for the normal paper sheets is read from the ROM 13 (Step S2). The nominal copying magnification is corrected in accordance with the magnification correction value. For example, when the nominal copying magnification is life-size or 1, the magnification of the lens unit 54 and the moving speed of the movable members 57, 58 are respectively set so that the document image formed on the drum 81 becomes 1.001 (Step S3, S4).

Subsequently, the toner image formed on the drum 81 is transferred (Step S5). More specifically, the image of the document G image is read with the lens unit 54 set at the above-set operative magnification and the movable members 57, 58 moving at the above-set operative moving speed. The electrostatic latent image (document image) which is 1.001 times as large as the image of the document G is formed on the circumferential surface of the drum 81 and developed into the toner image, which is transferred to the copy sheet. The toner image transferred to the copy sheet is heated and pressed against the copy sheet by the fixing device 11, thereby being fixed to the copy sheet. During this fixing operation, the copy sheet (normal paper sheet) shrinks due to the heat from the fixing device 11 and the magnification of the document image on the copy sheet to the image of the document G becomes 1 or life size.

When the copy sheet is a tracing paper (YES in Step S6), the magnification correction value (2.4%) for the tracing paper is read from the ROM 13 (Step S7). The nominal copying magnification is corrected in accordance with the read magnification correction value. For example, when the nominal copying magnification is life-size or 1, the magnification of the lens unit 54 and the moving speed of the movable members 57, 58 are respectively set so that the document image formed on the drum 81 becomes 1.024 (Step S3, S4). With this correction, the document image on the copy sheet after the fixing operation is allowed to have an magnification of life-size or 1.

When the copy sheet is a film sheet (NO in Step S6), the magnification correction value (5.8%) for the film sheet is read from the ROM 13 (Step S8). The nominal copying magnification is corrected in accordance with the read magnification correction value. For example, when the nominal copying magnification is life-size or 1, the magnification of the lens unit 54 and the moving speed of the movable members 57, 58 are respectively set so that the document image formed on the drum 81 becomes 1.024 (Step S3, S4). With this correction, the document image on the copy sheet after the fixing operation is allowed to have a magnification of life-size or 1.

In this way, the thermal shrinkage of the copy sheet due to the heat of the fixing device 11 is taken into consideration beforehand. The nominal copying magnification is corrected based on the magnification correction value corresponding to the type of copy sheet so as to enlarge automatically the document image by an amount of the thermal shrinkage. Accordingly, the magnification of the document image on the copy sheet is allowed to coincide accurately with the set nominal copying magnification.

Figure 4:
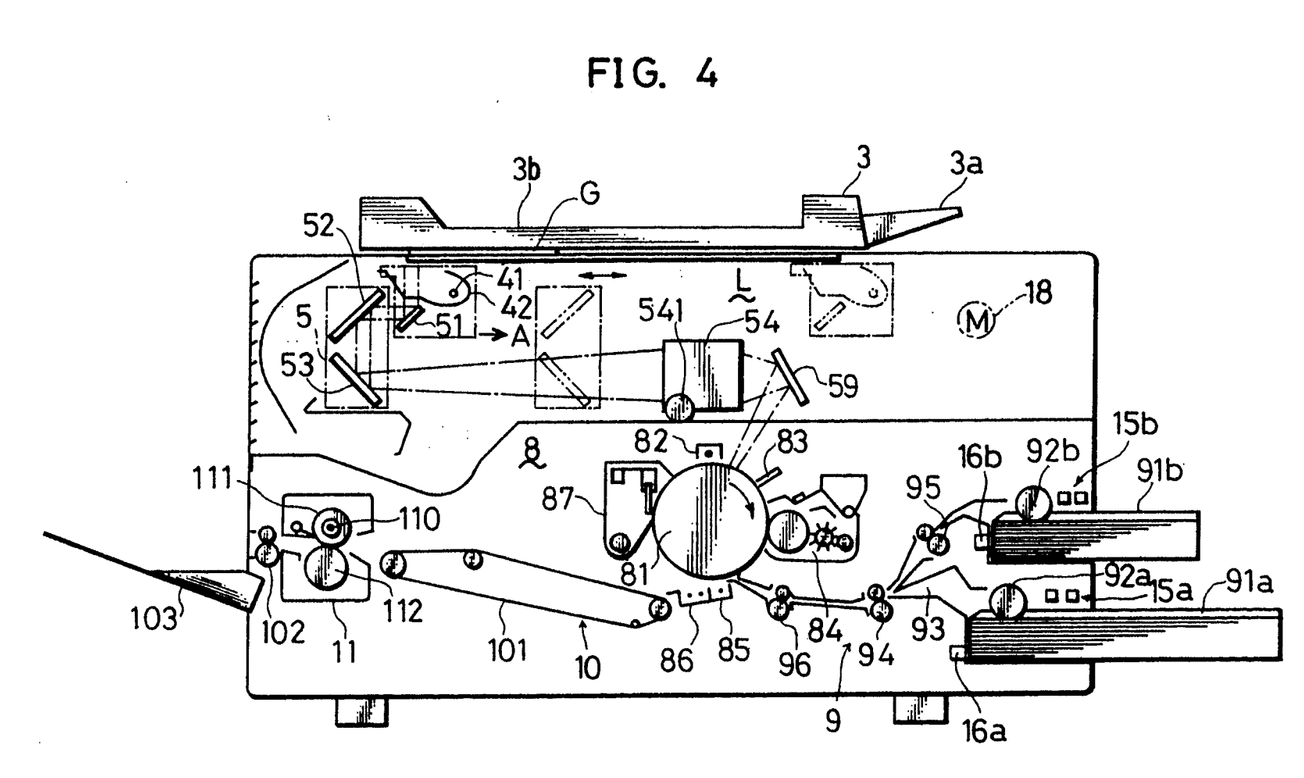
FIG. 4 is a schematic construction diagram showing an exemplary analog copying machine according to the invention.

The invention is applicable not only to the image forming apparatus wherein the document image is read by the image pick-up device 6, temporarily stored, and formed on the drum 81 by the scanning of the laser beam from the laser emitter 71, but also to an analog copying machine as shown in FIG. 4. In this analog copying machine, a reflection mirror 59 is provided in place of the image pick-up device 6 and the laser emitter 71. The light from a lens unit 54 is introduced directly to a photosensitive drum 81 through the reflection mirror 59, thereby exposing the drum 81.

Even in this case, the magnification of the lens unit 54 and the moving speed of movable members 57, 58 are controlled such that the nominal copying magnification is corrected based on the magnification correction value corresponding to the type of copy sheet. Thus, the magnification of the document image after the fixing operation coincides accurately with the copying magnification.

Figure 5:
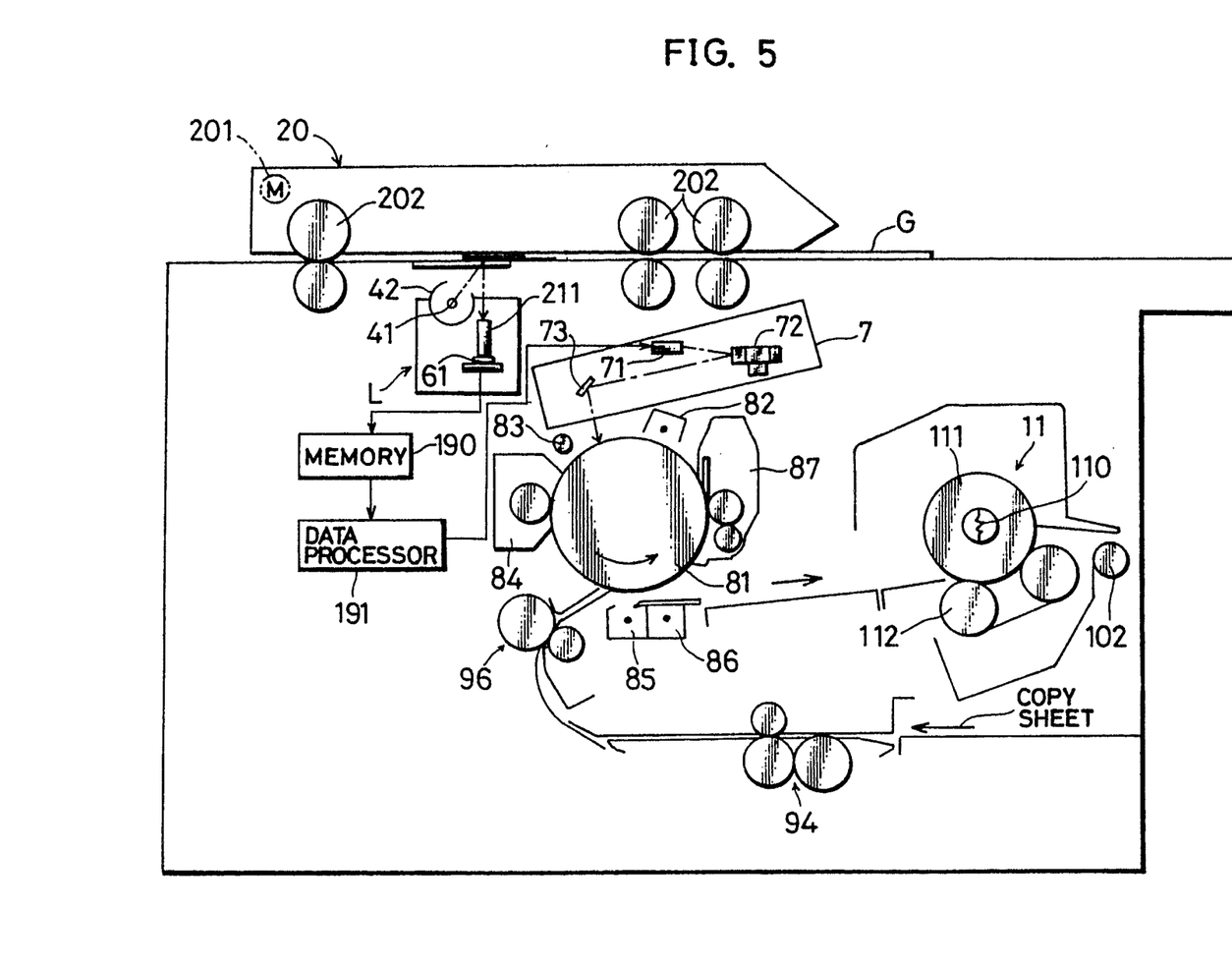
FIG. 5 is a schematic construction diagram showing a copying machine of the document moving type according to the invention.

The invention is applicable also to an image forming apparatus shown in FIG. 5 in which an optical assembly L is fixed and, instead, a document G is transported in the sub-scanning direction of the document G by a transport device 20 including a plurality of pairs of document transport rollers 202 driven by a drive motor 201.

In this image forming apparatus, in order to simplify the construction of the optical assembly L, there are provided a focusing element 211 having a fixed nominal magnification of life-size or 1 and a solid state image sensor 61 arranged on a lower face of the element 211. This apparatus is constructed such that the nominal copying magnification is corrected based on a magnification correction value corresponding to the type of copy sheet, and the image of the document G is read by controlling the drive motor 201 based on the corrected copying magnification to control the document transport speed of the rollers 202.

More specifically, the image of the document G is read in the main scanning direction and introduced through the focusing element 211 at a magnification of life-size or 1 to the solid state image sensor 61, and stored temporarily in a memory 190. When the stored data is read from the memory 190, a data processor 191 outputs the image data scanned in the main scanning direction to the laser emitter 71 while correcting the same suitably according to the nominal magnification if the corrected copying magnification is in excess of 1.

The laser emitter 71 in turn emits a laser beam to scan the drum 81 to form a document image thereon. If the corrected magnification is below 1, the data processor 191 outputs the image date to the laser emitter 71 while compressing the same suitably according to the magnification.

In this way, even the image forming apparatus using the focusing element 211 having the magnification of life-size or 1 is capable of correcting the nominal copying magnification based on the magnification correction value corresponding to the type of copy sheet. Consequently, the magnification of the document image on the copy sheet after the fixing operation is allowed to coincide accurately with the nominal copying magnification.

Also, it may be appreciated to correct the magnification in the sub-scanning direction of the image data in addition to the magnification in the main scanning direction by expanding or compressing the image data instead of controlling the document transport speed of the rollers 202.

Furthermore, it may be appropriate to store the image data in the memory 190 after interpolating or compressing the same by the data processor 191 and to output the stored content of the memory 190 to the laser emitter 71.

Although the copying magnification can be set desirably the foregoing embodiment, the invention is also applicable to an image forming apparatus having only a nominal magnification of life-size or 1.

As described above, according to the invention, correction values corresponding to a change in the size of a copy sheet due to the heat during a fixing operation are stored in correspondence with the types of the copy sheet, and a nominal copying magnification can be corrected based on the correction value corresponding to the type of copy sheet. Accordingly, the change in the magnification of the document image resulting from the change in the size of the copy sheet can be corrected automatically, thereby allowing the magnification of the document image on the copy sheet to coincide accurately with the set nominal copying magnification.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image forming apparatus comprising:
    toner image forming means for forming a toner image corresponding to an image of an original document at a set operative copying magnification;
    transfer means for transferring the toner image onto a copy item;
    fixing means for fixing the toner image on the copy item under heat;
    storage means for storing correction values for a plurality of types of copy item usable in the image forming apparatus respectively, the correction values being adapted for correcting a change in length of a copy item due to the heat of the fixing means;
    judge means for judging what type a present copy item is of; and
    magnification setting means for setting an operative copying magnification for the toner image forming means, the magnification setting means including:
        nominal copying magnification setting means for setting a nominal copying magnification;
        correcting means for reading a correction value corresponding to the judged copy item type from the storage means and correcting the set nominal copying magnification into the operative copying magnification.

2. An image forming apparatus as defined in claim 1 further comprising:
    a plurality of copy item holders for holding different types of copy items respectively;
    manual selection means for selecting a desired type of copy item manually;
    wherein the judge means is responsive to the manual selection means to judge the type of copy item.

3. An image forming apparatus as defined in claim 1 further comprising:
    a copy item holder for holding a copy item;
    wherein the judge means includes detection means provided on the copy item holder for detecting the type of copy item placed in the copy item holder.

4. An image forming apparatus as defined in claim 3 wherein the detection means includes a detector for detecting the material of copy item to judge the type of copy item.

5. An image forming apparatus as defined in claim 3 wherein:
    the copy item holder is further provided with an identification member for identifying the type of copy item placed in the copy item holder; and
    the detection means includes a detector for detecting the identification member to judge the type of copy item.

6. An image forming apparatus as defined in claim 1 wherein:
    the toner image forming means includes:
        optical image reading means for reading an optical image from the document in a main scanning direction while rendering a relative movement in a sub-scanning direction with respect to the document;
        an optical system having a variable magnification for introducing the optical image to the optical image reading means;
    the correcting means includes:
        operable means for changing the magnification of the optical system and the relative movement speed in the sub-scanning direction of the optical image reading means to attain the operative copying magnification.

7. An image forming apparatus as defined in claim 1 wherein:
    the toner image forming means includes:
        optical image reading means for reading an optical image from the document in a main scanning direction while rendering a relative movement in a sub-scanning direction with respect to the document to produce electrical image data;
        image processor means for processing the electrical image data;
    the correcting means includes:
        image processor control means for controlling the image processor means to correct the electrical image data to attain the operative copying magnification.

8. An image forming apparatus as defined in claim 7 wherein the correcting means further includes operable means for changing the relative movement speed in the sub-scanning direction of the optical image reading means.

9. An image forming apparatus as defined in claim 1 wherein:

the toner image forming means includes:

a photosensitive member;

an optical system having a variable magnification for introducing an optical image from the document to the photosensitive member;

the correcting means includes:

operable means for changing the magnification of the optical system to attain the operative copying magnification.

* * * * *